(12) United States Patent
Ajith Kumar et al.

(10) Patent No.: US 9,703,670 B2
(45) Date of Patent: Jul. 11, 2017

(54) PERFORMANCE STATE MACHINE CONTROL WITH AGGREGATION INSERTION

(71) Applicant: Microsoft Technology Licensing, LLC, Redmond, WA (US)

(72) Inventors: Harikrishna Menon Ajith Kumar, Redmond, WA (US); Pankaj Kachrulal Sarda, Redmond, WA (US); Carlos Pessoa, Redmond, WA (US); David William Shoots, Hollis, NH (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 310 days.

(21) Appl. No.: 14/590,049

(22) Filed: Jan. 6, 2015

(65) Prior Publication Data
US 2016/0196198 A1    Jul. 7, 2016

(51) Int. Cl.
*G06F 9/44* (2006.01)
*G06F 11/34* (2006.01)
(Continued)

(52) U.S. Cl.
CPC ...... *G06F 11/3495* (2013.01); *G06F 11/3003* (2013.01); *G06F 11/3082* (2013.01);
(Continued)

(58) Field of Classification Search
CPC .. G06F 3/0482; G06F 17/18; G06F 17/30029; G06F 17/30864; G06F 11/0781; G06F 11/3636; G06F 11/3676
See application file for complete search history.

(56) References Cited

U.S. PATENT DOCUMENTS 6,205,575 B1    3/2001  Sherman et al.
6,266,788 B1 *  7/2001  Othmer ............... G06F 11/3636
                                                          707/999.202
(Continued)

OTHER PUBLICATIONS

Tsun S. Chow; Testing Software Design Modeled by Finite-State Machines ; 1978 IEEE; pp. 178-187; <http://ieeexplore.ieee.org/stamp/stamp.jsp?arnumber=1702519>.*
(Continued)

*Primary Examiner* — Thuy Dao
*Assistant Examiner* — Cuong V Luu
(74) *Attorney, Agent, or Firm* — Ogilvie Law Firm

(57) ABSTRACT

A performance state machine is controlled in part by identifying notifications from an execution trace of an application program, through rapid automatic comparison of trace events to notification events for notification categories. Some notification categories include application startup, page outline load, page data load start, page data load finish, page to page transition, application input, window size change, media query, binding update, page background task start, page background task finish, developer-defined scenario start, and developer-defined scenario finish. Notifications may reflect heuristics such as the time from startup to first frame submission. A state is placed in the performance state machine for each identified notification, with aggregate application performance data for each transition between identified notifications. Some performance data categories include network activity, disk activity, memory usage, parse time, frame time, dropped frames, component or overall frame rates, and thread utilization. Timelines and other visual representations aid application performance optimization.

20 Claims, 5 Drawing Sheets

(51) Int. Cl.
*G06F 11/30* (2006.01)
*G06F 11/32* (2006.01)
(52) U.S. Cl.
CPC .......... *G06F 11/323* (2013.01); *G06F 11/328* (2013.01); *G06F 11/3476* (2013.01); *G06F 2201/86* (2013.01); *G06F 2201/865* (2013.01)

(56) References Cited

U.S. PATENT DOCUMENTS

| | | | |
|---|---|---|---|
| 6,370,572 B1 | 4/2002 | Lindskog et al. | |
| 7,131,113 B2* | 10/2006 | Chang | G06F 11/3664 714/E11.207 |
| 7,683,902 B1 | 3/2010 | Tazoe et al. | |
| 7,784,008 B1 | 8/2010 | Hutton et al. | |
| 2002/0129339 A1* | 9/2002 | Callahan, II | G06F 11/3404 717/127 |
| 2006/0129999 A1 | 6/2006 | Hiraoka et al. | |
| 2006/0242627 A1* | 10/2006 | Wygodny | G06F 11/3636 717/128 |
| 2008/0184209 A1 | 7/2008 | LaFrance-Linden | |
| 2009/0089013 A1 | 4/2009 | Gooding et al. | |
| 2009/0235056 A1 | 9/2009 | Hirai et al. | |
| 2011/0314481 A1 | 12/2011 | Bernstein et al. | |
| 2012/0124363 A1 | 5/2012 | Dietrich et al. | |
| 2013/0205020 A1 | 8/2013 | Broda et al. | |
| 2013/0249917 A1* | 9/2013 | Fanning | G06T 11/206 345/440 |
| 2013/0346917 A1 | 12/2013 | Bragdon et al. | |
| 2014/0013309 A1 | 1/2014 | Gounares | |
| 2014/0089903 A1* | 3/2014 | Chen | G06F 11/3461 717/131 |
| 2015/0234730 A1* | 8/2015 | Puthuff | G06F 11/3636 717/128 |
| 2015/0355996 A1* | 12/2015 | Smith | G06F 11/3636 717/128 |

OTHER PUBLICATIONS

Ermeson Carneiro et al.; Mapping SysML State Machine Diagram to Time Petri Net for Analysis and Verification of Embedded Real-Time Systems with Energy constraints ; 2008 IEEE; 6 pages; <http://ieeexplore.ieee.org/stamp/stamp.jsp?arnumber=4641225>.*
Alexander Knapp et al.; Model Checking and Code Generation for UML State Machines and Collaborations; 2002 Citeseer; 6 pages; <http://citeseerx.ist.psu.edu/viewdoc/download?doi=10.1.1.85.8649&rep=rep1&type=pdf>.*
Paul T. Ward; The Transformation Schema An Extension of the Data Flow Diagram to Represent Control and Timing; 1986 IEEE; pp. 198-208; <http://ieeexplore.ieee.org/stamp/stamp.jsp?arnumber=6312936>.*
Manuj Aggarwal et al.; Test Case Generation from UML State Machine Diagram A Survey; 2012 IEEE; pp. 133-140; <http://ieeexplore.ieee.org/stamp/stamp.jsp?arnumber=6394682>.*
Wang Linzhang et al.; Generating Test Cases from UML Activity Diagram based on Gray-Box Method; 2004 IEEE; 8 pages; <http://ieeexplore.ieee.org/stamp/stamp.jsp?arnumber=1371930>.*
Calhoun, Kate, "Windows Performance ToolKit—Xpert", retrieved on Oct. 20, 2014, from <<https://blogs.msdn.com/cfs-filesystemfile.ashx/__key/communityserver-components-postattachments/00-09-52-44-66/Tatec__5F00__Xperf.pptx>>, Copyright 2009, 56 pages.
"Load Testing Scenarios Selection", in White Paper of AgileLoad, retrieved on: Oct. 20, 2014, 7 pages.
"Software performance testing", retrieved from <<http://en.wikipedia.org/wiki/Software_performance_testing>>, Nov. 25, 2014, 9 pages.
"Second Written Opinion Received For PCT Application No. PCT/US2016/012100", Mailed Date: Jan. 23, 2017, 6 Pages.
"International Search Report and Written Opinion Issued in PCT Application No. PCT/US2016/012100", Mailed Date: Aug. 31, 2016, 17 Pages.
"International Preliminary Report on Patentability Issued in PCT Application No. PCT/US2016/012100", Mailed Date: Apr. 13, 2017, 9 Pages.

* cited by examiner

PERFORMANCE STATE MACHINE CONTROL WITH AGGREGATION INSERTION

BACKGROUND

In computing, different kinds of performance tests are done to assess computing system performance in various circumstances. System performance characteristics such as responsiveness, reliability, scalability, and resource usage, among others, can be investigated or verified under a particular workload pattern. For example, load testing can investigate a computing system's behavior under a specific work load, such as a specified number of concurrent users of an application who perform a specific number of transactions within a specified time period. Stress testing can investigate the upper limits of system capacity under extreme loads to help developers or administrators determine the system's breaking point. Endurance testing can investigate the system's ability to operate continuously for long periods under normal loads, by detecting slow leaks in memory usage and other performance degradation. Spike testing can investigate the system's ability to properly handle sudden increases in load, such as spikes generated by sudden demands from a very large number of users. Configuration tests can investigate the performance impact of configuration changes to the system's components, such as changing system configuration by swapping storage subsystems, adding threads, or adding machines to a cluster or to a cloud-based architecture.

SUMMARY

Some embodiments control a performance state machine in part by identifying notifications from an execution trace of an application program. The execution trace includes a plurality of trace events within a period which has endpoints. The notifications are identified through comparison of trace events to notification events for one or more notification categories. Some examples of notification categories include application startup, page outline load, page data load start, page data load finish, page to page transition, application input, window size change, media query, binding update, page background task start, page background task finish, developer-defined scenario start, and developer-defined scenario finish. Some embodiments place a state in the performance state machine for each identified notification, with aggregate application performance data for each transition between identified notifications. The performance data individually and/or collectively include data in one or more performance data categories. Some examples of performance data categories include network activity, disk activity, memory usage, parse time, frame time, elapsed time, dropped frames, component frame rate, overall frame rate, CPU utilization, and thread utilization. Some embodiments insert performance data aggregations in the performance state machine. Some display a visual representation of the state machine states, transitions, and performance data aggregations on a display screen. Some capture altered performance of the application in an updated execution trace, and some of those subsequently alter at least one state, transition, or performance data aggregation of the state machine.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Acronyms

Figure 1:
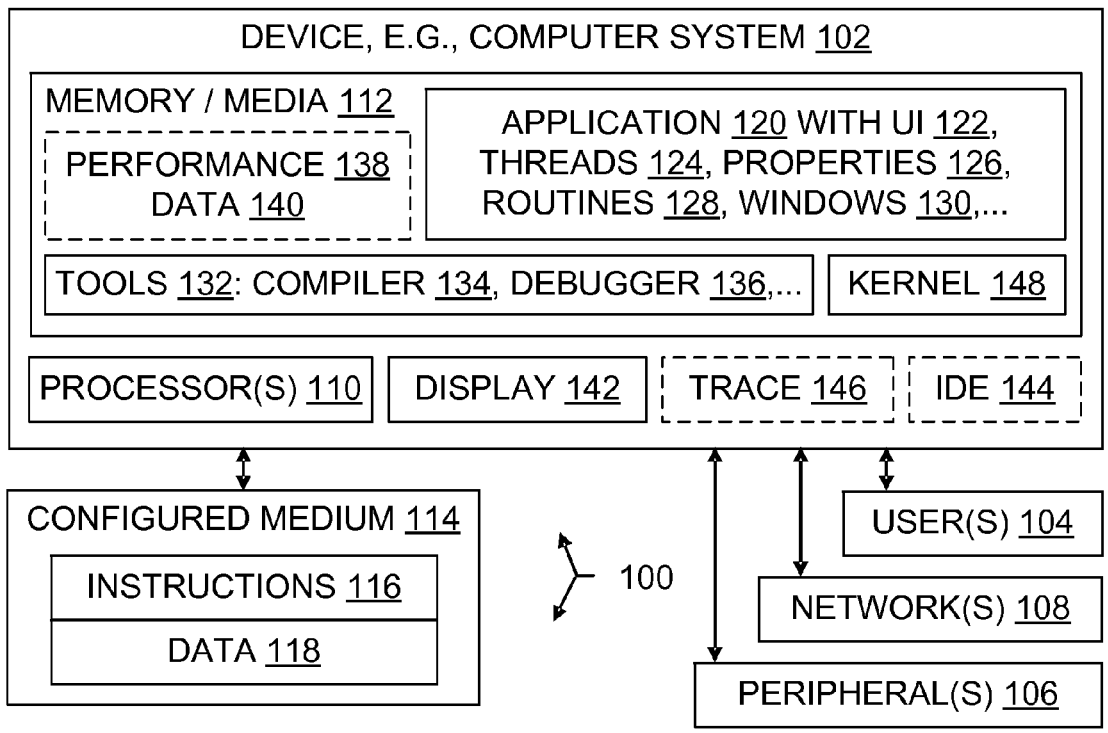
FIG. 1 is a block diagram illustrating a computer system having at least one processor and at least one memory which interact with one another for the control of application performance optimization, and other items in an operating environment which may be present on multiple network nodes, and also illustrating configured storage medium (as opposed to propagated signal) embodiments.

Some acronyms are defined below, but others may be defined elsewhere herein or require no definition to be understood by one of skill.

ALU: arithmetic and logic unit
API: application program interface
CD: compact disc
CGI: computer-generated imagery
CPU: central processing unit
CSS: cascading style sheets
DVD: digital versatile disk or digital video disc
FPGA: field-programmable gate array
FPS: frames per second
FPU: floating point processing unit
GPU: graphical processing unit
GUI: graphical user interface
HTML: hypertext markup language
IDE: integrated development environment, sometimes also called "interactive development environment"
RAM: random access memory
ROM: read only memory
UI: user interface Overview As used here, "frame" refers to a frame in a sequence of successively displayed images. A give frame may appear one or more times in the sequence, but the present teachings are particularly helpful when each frame displayed in an animation sequence has different display content than the prior frame.

A "frame buffer" is a digital memory which holds pixel data for display on a display screen. Such pixel data is an example of "display content."

"Frame rate" is the number of frames displayed within a given time period, either by given component(s) of a system or by an overall system. Progressive scanning is assumed in the examples herein unless interlacing is indicated, but the teachings provided apply regardless.

Frame rate can be identified either as the number of frames per second, or as the duration of a given frame. A frame rate of 24 FPS (frames per second), for example, corresponds to a frame duration of $\frac{1}{24}^{th}$ of a second, which is about 42 ms (milliseconds). 25 FPS corresponds to a frame lasting exactly 40 ms, 30 FPS corresponds to a frame length of about 33 ms, 46 FPS corresponds to frames that are approximately 22 ms, and so on. Progressive formats that operate at 24 FPS or 25 FPS are well known. Thomas Edison indicated that 46 FPS is the minimum needed for the human visual cortex to avoid eye strain. In the present context, a target for providing user interfaces that people perceive as smooth and responsive includes frame durations of 16 ms or less, which corresponds to a frame rate of 62.5 FPS or higher.

"Frame preparation time" is the time spent preparing a frame, e.g., obtaining and/or generating the frame's pixel data and placing it in the frame buffer. This may be the time spent by given component(s) of a system or by an overall system. Shorter frame preparation times contribute to faster frame rates, particularly when frame display content changes with each frame and frames are displayed as soon as they are prepared or shortly thereafter.

In computing system architectures that use retained mode graphics, frames are generated for a variety of reasons. Screen widgets and user interface controls may be animated or relocated. Windows may be opened, closed, resized, moved, or refreshed. Other displayed items may be animated, resized, rotated and/or translated, morphed, and otherwise altered in some way that invalidates a displayed frame and results in creation and display of a replacement frame.

Excessive or long frame preparation times can contribute to poor application performance and responsiveness. As used here, a "long frame preparation time" is one 17 ms or greater, and an "excessive frame preparation time" is a long frame preparation time that is also at least 5 ms longer than the previous frame's preparation time.

It can be very difficult to determine what specific event or set of events caused or contributed to the performance of a particular scenario, e.g., what caused a frame to be prepared for display. Developers may manually inspect a large number of events and still be unable to determine precisely the root cause, e.g., the exact reason a frame was invalidated and hence the exact reason time and resources were taken to prepare a replacement for the invalidated frame. Timeline tools depend on locality of reference, which is imprecise. Under a familiar locality of reference approach, any of the numerous events that happened before a frame invalidation or other scenario could be the cause of the scenario, and it is left to developers to use their knowledge of the particular code to try and identify the small subset of events that actually caused the scenario.

Tool displays that depict application execution by displaying events of interest generally tend to overwhelm users with the sheer number of events that happen during application execution. In-order to troubleshoot problems in an application, users often have to know what specific narrow range of time, or what specific low-level event, they are looking for in a trace, and may have to instrument their application to identify these specifics.

Some embodiments presented herein aggregate performance data on a per-scenario basis and attribute scenario causality automatically. Some examine events that precede a scenario and determine an event or subset of events that causes the scenario. Some embodiments bring optimization issues and opportunities to the front of a developer's attention by automatically aggregating performance data on scenarios important to application responsiveness and fluidity like Application Startup, Page Load & Transition, Application Input (e.g., handling/responsiveness), Window Size Changes and many more. Users can also use these scenarios to visualize their application execution in a state machine and correspondingly identify opportunities of optimization throughout execution. Details used in various alternative embodiments are discussed.

Some embodiments described herein may be viewed in a broader context. For instance, concepts such as aggregation, change, categorization, control, filtering, identification, invalidation, performance, time and/or visualization may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems. Other media, systems, and methods involving aggregation, change, categorization, control, filtering, identification, invalidation, performance, time and/or visualization are outside the present scope. Accordingly, vagueness, mere abstractness, lack of technical character, and accompanying proof problems are also avoided under a proper understanding of the present disclosure.

The technical character of embodiments described herein will be apparent to one of ordinary skill in the art, and will also be apparent in several ways to a wide range of attentive readers. First, some embodiments address technical problems such as attributing scenario causality, increasing frame rate and/or other performance measures, and filtering out extraneous data. Second, some embodiments include technical components such as computing hardware which interacts with software in a manner beyond the typical interactions within a general purpose computer. For example, in addition to normal interaction such as memory allocation in general, memory reads and write in general, instruction execution in general, and some sort of I/O, some embodiments described herein apply filters to isolate particular kinds of property changes, resource usages, and/or other events. Third, technical effects provided by some embodiments include reduction of computational resource usage, such as less memory usage and/or less GPU usage. Fourth, some embodiments modify technical functionality of applications by optimizing retained mode graphics processing and/or software processing based on technical considerations such as consolidating changes so they provoke a smaller number of scenarios. Fifth, technical advantages of some embodiments include one or more of the following: simplified application development, reduced hardware requirements (memory, CPU, GPU), faster processing of a given scenario effort, and reduced processing workloads.

Reference will be made to exemplary embodiments such as those illustrated in the drawings, and specific language will be used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

Some Additional Terminology

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Quoted terms are defined explicitly, but quotation marks are not used when a term is defined implicitly. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, smartphones, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

"Program" is used broadly herein, to include applications, kernels, drivers, interrupt handlers, firmware, state machines, libraries, and other code written by programmers (who are also referred to as developers).

"Routine" means a function, a procedure, an exception handler, an interrupt handler, or another block of instructions which receives control via a jump and a context save. A context save pushes a return address on a stack or otherwise saves the return address, and may also save register contents to be restored upon return from the routine.

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance; (g) embedment in an implanted medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, or physical transportation system monitoring.

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. For example, certain familiar devices perform balance calculations to maintain their balance; some examples include mobile robots and wheeled personal mobility devices. These devices are not part of the embodiments described herein but they illustrate the point that technical effects are provided by technical components, not by mere mental steps. Balance calculations simply cannot be performed rapidly enough by mental steps or by paper and pencil to provide the balance that is present in many mobile robots or wheeled personal mobility devices. The technical effect of having a dynamically balanced device is thus provided by technical components which include a processor and a memory interacting with balance control software.

Frame rate improvements are part of some embodiments described herein. One of skill understands that frame preparation calculations simply cannot be performed rapidly enough by mental steps or by paper and pencil to provide the smoothness and responsiveness sought in software user interface frame sequences. In particular, the use of mental steps or strictly human computations would cause long and excessive frame preparation times. Similarly, confining frame causality attribution to mental steps or strictly human computations would make the control of display invalidation unwieldy, inefficient, and ineffective in comparison to the embodiments described herein. Similar considerations apply to many other scenarios discussed herein.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Linguistically" means by using a natural language or another form of communication which is often employed in face-to-face human-to-human communication. Communicating linguistically includes, for example, speaking, typing, or gesturing with one's fingers, hands, face, and/or body.

Throughout this document, use of the optional plural "(s)", "(es)", or "(ies)" means that one or more of the indicated feature is present. For example, "processor(s)" means "one or more processors" or equivalently "at least one processor".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as activating, aggregating, altering, applying, attributing, binding, bounding, capturing, changing, comparing, designating, displaying, eliminating, execution, filtering, identifying, increasing, inputting, inserting, invalidating, launching, laying out, linking, listing, loading, modifying, obtaining, placing, preparing, processing, producing, querying, reaching, receiving, reducing, referencing, rendering, resizing, serializing, sorting, specifying, tracing, treating, updating, using, or visualizing (or activates, aggregates, activated, aggregated, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. Unless expressly stated otherwise in a claim, a claim does not cover a signal per se. For the purposes of patent protection in the United States, a memory or other computer-readable storage medium is not a propagating signal or a carrier wave outside the scope of patentable subject matter under United States Patent and Trademark Office (USPTO) interpretation of the In re Nuijten case.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise, "computer readable medium" means a computer readable storage medium, not a propagating signal per se.

An "embodiment" herein is an example. The term "embodiment" is not interchangeable with "the invention". Embodiments may freely share or borrow aspects to create other embodiments (provided the result is operable), even if a resulting aspect combination is not explicitly described per se herein. Requiring each and every permitted combination to be explicitly described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, as an IoT node, and/or in other ways.

Human users 104 may interact with the computer system 102 by using displays, keyboards, and other peripherals 106, via typed text, touch, voice, movement, computer vision, gestures, and/or other forms of I/O. A user interface may support interaction between an embodiment and one or more human users. A user interface may include a command line interface, a graphical user interface (GUI), natural user interface (NUI), voice command interface, and/or other interface presentations. A user interface may be generated on a local desktop computer, or on a smart phone, for example, or it may be generated from a web server and sent to a client. The user interface may be generated as part of a service and it may be integrated with other services, such as social networking services. A given operating environment includes devices and infrastructure which support these different user interface generation options and uses.

Natural user interface (NUI) operation may use speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

As another example, a game application may be resident on a Microsoft XBOX Live® server (mark of Microsoft Corporation). The game may be purchased from a console and it may be executed in whole or in part on the server, on the console, or both. Multiple users may interact with the game using standard controllers, air gestures, voice, or using a companion device such as a smartphone or a tablet. A given operating environment includes devices and infrastructure which support these different use scenarios.

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments. Other computer systems not shown in FIG. 1 may interact in technological ways with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, solid-state media, and/or of other types of physical durable storage media (as opposed to merely a propagated signal). In particular, a configured medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se.

The medium 114 is configured with instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, cell phone, or gaming console), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In the illustrated environments 100, one or more applications 120 have components such as a user interface 122, threads 124, object or other structure properties 126, routines 128, and user interface windows 130. Software development tools 132 such as compilers 134 and debuggers 136 assist with software development by producing and/or transforming code which implements components. Execution of the application overall or of components such as routines or threads has associated performance 138 (a.k.a. performance characteristics), at least some of which may be captured (exactly or approximately, and fully or partially) in performance data 140. The visual portion of the user interface of the application, and visual output of the application, are displayed on a visual display 142. The application components, tools 132, and other items shown in the Figures and/or discussed in the text, may each reside partially or entirely within one or more hardware media 112, thereby configuring those media for technical effects which go beyond the "normal" (i.e., least common denominator) interactions inherent in all hardware—software cooperative operation.

The display 142 may include one or more touch screens, screens responsive to input from a pen or tablet, or screens which operate solely for output. In addition to processors 110 (CPUs, ALUs, FPUs, and/or GPUs), memory/storage media 112, display(s) 142, and battery(ies), an operating environment may also include other hardware, such as buses, power supplies, wired and wireless network interface cards, and accelerators, for instance, whose respective operations are described herein to the extent not already apparent to one of skill. CPUs are central processing units, ALUs are arithmetic and logic units, FPUs are floating point processing units, and GPUs are graphical processing units.

A given operating environment 100 may include an Integrated Development Environment (IDE) 144 which provides a developer with a set of coordinated software development tools 132 such as compilers, source code editors, profilers, debuggers, and so on. In particular, some of the suitable operating environments for some embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but teachings herein are applicable with a wide variety of programming languages, programming models, and programs, as well as with technical endeavors outside the field of software development per se.

An execution trace 146 may be present. The trace may be a product of a tool 132 which also resides on the system 102, or the trace may have been produced on another system and then transferred by a network, flash drive, or other mechanism to the present location. The trace may document execution of an application 120 which resides on the same machine as the trace, or the trace may document execution of an application run on a different machine.

One or more items are shown in outline form in the Figures to emphasize that they are not necessarily part of the illustrated operating environment or all embodiments, but may interoperate with items in the operating environment or some embodiments as discussed herein. It does not follow that items not in outline form are necessarily required, in any Figure or any embodiment. In particular, FIG. 1 is provided for convenience; inclusion of an item in FIG. 1 does not imply that the item, or the describe use of the item, was known prior to the current innovations.

Systems

Figure 2:
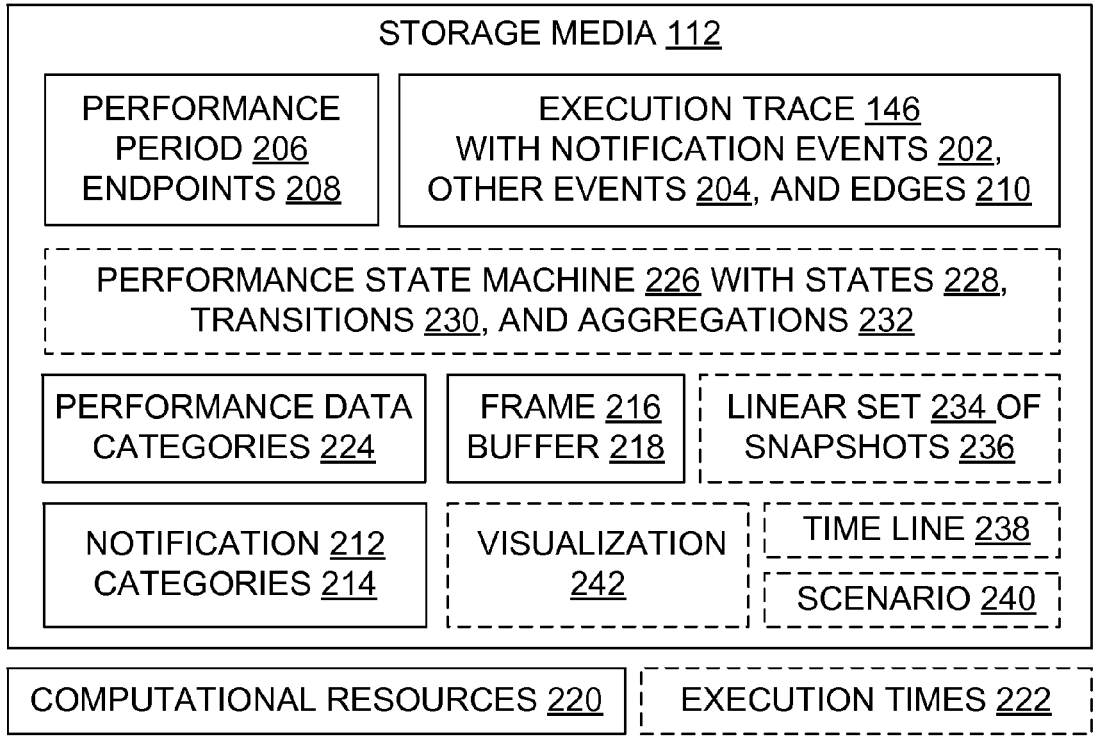
FIG. 2 is a block diagram illustrating an example architecture with aspects of performance data aggregation and state machine control.

FIG. 2 illustrates aspects of an architecture which is suitable for use with some embodiments. An execution trace 146 has associated notification events 202 and other events 204 for at least one performance period 206. Designation 204 refers to trace events generally; a notification event 202 is a non-exclusive example of an event 204. In some implementations, notification events may be virtual, in that they are injected by post-trace processing. The performance period has a start point and a finish point, collectively referred to as the period's endpoints 208. The execution trace 146 has a leading edge and a trailing edge, collectively referred to as the trace's edges 210. Either edge may coincide with an event 204, but in some cases a trace starts before the earliest traced event and in some it ends after the last of the traced events.

In some examples, the events 204 may include zero or more layout property change events which document changes in layout properties 126, zero or more render property change events which document changes in render properties 126, or both. Layout properties 126 document a display layout value, e.g., a relative or absolute screen position, a line width, a margin, or a visibility. Render properties 126 document a display render value, e.g., display resolution, color palette, number of gray levels, whether ray tracing is to be performed, and so on. In some examples, zero or more of the properties 126 reside in a list of frame 216 invalidating change events, which are examples of notification 212 events. Frame invalidating properties are properties whose change would (or should) provoke a re-creation of pixel content to display, either directly in a display 142 or via a frame buffer 218.

In some examples, one or more notification categories 214 operate at an object level, e.g., by specifying a list of graphic objects in a retained mode graphics structure. In some examples, notification categories specify a list of routines, as window resize routines and CSS media query routines. In a given example, a frame 216 invalidation category 214 specifies one or more items which potentially (or in some cases, actually) invalidates a frame 216 when the item is changed or invoked.

In some examples, application of the notification categories 214 to trace events 204 whose timestamps lie within a particular frame's performance period 206 produces a set of events 204 which may have caused the prior frame's invalidation and hence caused the creation of the frame in question. These events may be ordered chronologically, or not.

Those of skill understand that a given event 204 may represent consumption of computational resources 220. Some examples of computational resources 220 are cycles on a particular CPU 110 or GPU 110, space allocated in RAM 112 or other memory, exclusive control of a shared data structure such as a synchronization lock, or access to a display 142 or network interface card or other peripheral 106. A given event 204 may also have an associated execution time 222, e.g., the time spent executing a given routine 128 named in the event and all the routines which were invoked directly or indirectly by that named routine. Use of computational resources may be divided according to some or all of the performance data categories 224 in a given example. Some examples of performance data categories 224 are memory performance, processor performance, network performance, kernel 148 performance, thread performance, disk performance, render engine performance, and so on.

Some embodiments provide a performance state machine 226 which has states 228, one or more transitions 230 between at least some of the states, and one or more aggregations 232 associated with one or more of the transitions. That is, a given transition 230 may have zero, one, or more associated aggregations 232. In some embodiments, the performance state machine is understood to depict performance data in the form of an application state machine. Some examples also or alternately include a linear set 234 of resource usage snapshots 236. Some examples also or alternately include a timeline 238 of events 204 and/or scenarios 240. Some examples also or alternately include a visualization 242 of the performance state machine 226, snapshots 236, timeline 238, and/or of the scenario(s) 240.

In some embodiments, display update code in the application 120 operates to update pixels, alpha channels, or other display content of a frame 216 when the frame is invalidated. Frame display content is implemented using display content data structures which include objects, structs, records, or other structures that have layout properties 126 and/or render properties 126, for example. A frame 216 is invalidated by a change in a layout property and/or by a change in a render property. After frame invalidation, a different frame is prepared for display on a display 142 screen. A display 142 includes at least a display screen in such cases, and may also include input sensors such as touch sensors, magnetic sensors, or optical beam sensors.

Property 126 changes and other events executed in the system 102 can be traced using injected breakpoints, interrupt handlers, exception handlers, macros, trace preprocessors, kernel 148 markers, and other familiar technologies, or trace mechanisms created hereafter. For example, some embodiments use Event Tracing for Windows technology to produce events 204. Trace events 204 are typically low level information such as a change in a particular variable (which may be a property or some other variable), throwing a particular exception, a particular routine invocation, or reaching a particular code branch. Trace file formats vary widely. Property names, routine names, other identifiers, and event titles are normally given in the natural language used by the developer(s) of the traced application, or something close to it, as opposed to being localized to the natural language of the application's end user.

Figure 3:
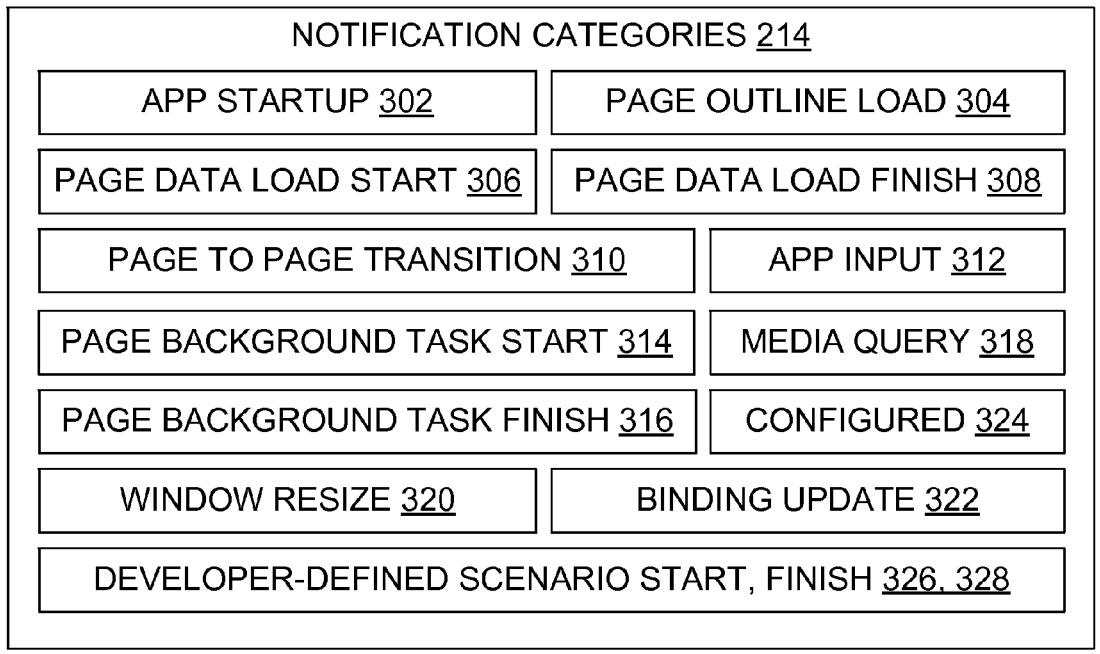
FIG. 3 is a block diagram illustrating notification categories.

FIG. 3 illustrates some notification categories 214. Scenarios 240 may be defined as individual notification categories 214 (e.g., window resize, media query), or as a set of related notification categories 214 (e.g., background task start and finish, all binding updates, all media queries to a particular medium). An app startup category 302 denotes application startup, e.g., a launch by a kernel plus initializations performed in the application 120 prior to displaying an initial frame 216. A page outline load category 304 denotes loading into a frame buffer 218 or a display 142 (depending on embodiment) of at least a portion of a page, with the understanding that additional data (e.g., images, lists, data read from a relational database, financial transaction data, etc.) will be loaded subsequently into positions indicated to the user in the loaded outline. Page data load start 306 and page data load finish 308 categories denote the start and finish of the loading of such additional data into a loaded outline. In some embodiments, a page load denotes server control of a user interface page object, invocation of an interface page-load routine, or a similar event. A page to page transition 310 denotes a transition from one page or page portion loaded in a display to at least a portion of a different page loaded in the display. Some embodiments distinguish between the transition's start and its finish. A user input event 312 denotes receipt by the application 120 of user input from a touch screen, keyboard (hard key or virtual), mouse, pen, microphone, camera, or another peripheral 106 capable of receiving or transmitting or indicating user input. Page background task start 314 and finish 316 categories denote the start and finish of a task (process, coroutine, thread, etc.) which runs in the background relative to the main thread or routine that performs page loading. A media query 318 denotes a query to determine viewing device type, width, height, orientation, resolution, aspect ratio, and/or color depth, for example. Media query 318 scenarios serve different style sheets in CSS in some examples. A window resize 320 denotes a change in the size of a user interface window which is displayed in a frame 216. Note that frame 216 pertains to the frame buffer and to pixels regardless of whether they happen to be part of a window; "frame" as used here does not refer to a window border or outline. A binding update 322 denotes a change in a binding between a data variable, such as a table or list entry, and a user interface element for obtaining a value, such as a textbox or set of radio buttons, for example. Some cases obtain a value shown in a textbox, or the state of a radio button. A configured scenario 324 is any other notification event in a trace 146 or notification category which a given system is configured to recognize. In particular, developer-defined scenarios may include start 326 and finish 328 developer-defined notification categories.

Figure 4:
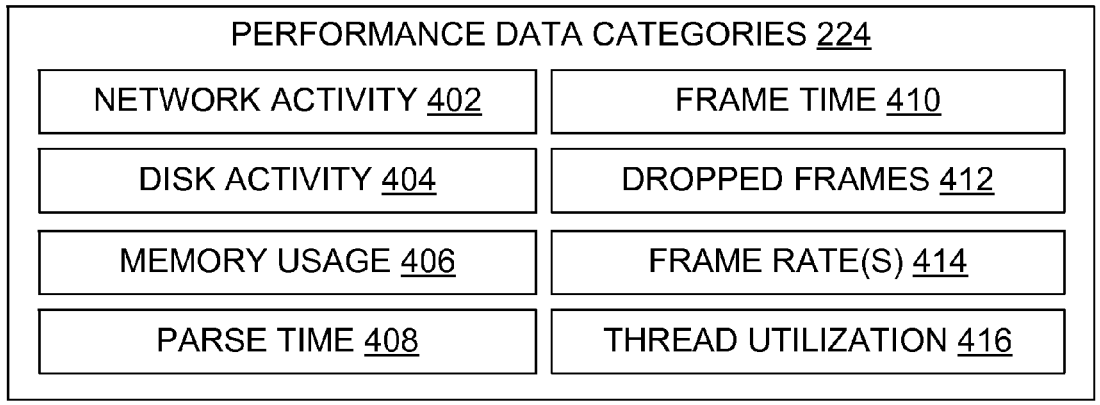
FIG. 4 is a block diagram illustrating performance data categories.

FIG. 4 illustrates some performance data categories 224. The illustrated categories are network activity 402, disk activity 404, memory usage 406, parse time 408, frame time 410, dropped frames 412, frame rate 414, and thread utilization 416. Those of skill understand that these may be defined in particular ways for a given embodiment, within the generally accepted meaning of the terminology shown in FIG. 4. For example, network activity 402 may be measured in terms of packet count, packet payload size transferred per unit of time elapsed, compliance with a network quality of service goal or agreement, and/or using other familiar measures of system activity that involves one or more networks 108. Similarly, disk activity 404 may be measured in terms of data transferred, read accesses per unit time, write accesses per unit time, and/or using other familiar measures of system activity that involves one or more RAM, optical, magnetic, or other disks in a system 102. Memory usage 406 may be measured in terms of allocated heap size, number of allocated heap objects, allocated stack size, and/or using other familiar measures of memory 112 usage. Parse time 408 may be measured in terms of command expression parse time, abstract syntax tree parse time, graphics object data structure parse time, file parse time, and/or using other measures suited to the item(s) being parsed, and may also be expressed in various units, e.g., elapsed milliseconds or the number of processor 110 cycles performed during a parse. Frame time 410, dropped frames 412, and frame rate 414 may each pertain to a system overall, or to a particular component of a system such as a graphics compositor or a CGI engine. Thread utilization 416 may be measured in terms of the absolute or relative amount of time a given thread or set of threads is idle, or is busy, or in terms of the number of threads, and/or using other familiar measures of the availability or usage of threads 124.

Figure 5:
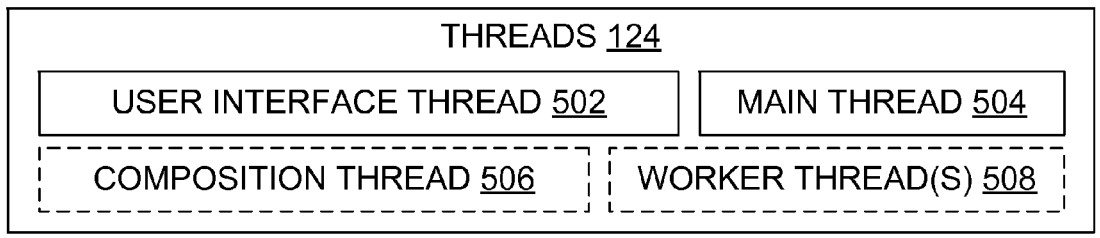
FIG. 5 is a block diagram illustrating threads.

FIG. 5 illustrates some threads 124. A user interface thread 502 performs and/or coordinates user interface operations such as updating a screen 142 and obtaining user inputs. A main thread 504 initiates and coordinates (and sometimes terminates) the other threads in an application, including the user interface thread 502, any composition threads 506, and any worker threads 508. A composition thread 506 is a particular kind of worker thread 508. A composition thread performs graphics composition to combine images or text into a frame 216. A worker thread 508 performs specific computational work, e.g., image composition, position calculation, ray tracing, encryption, decryption, compression, decompression, and so on.

Figure 6:
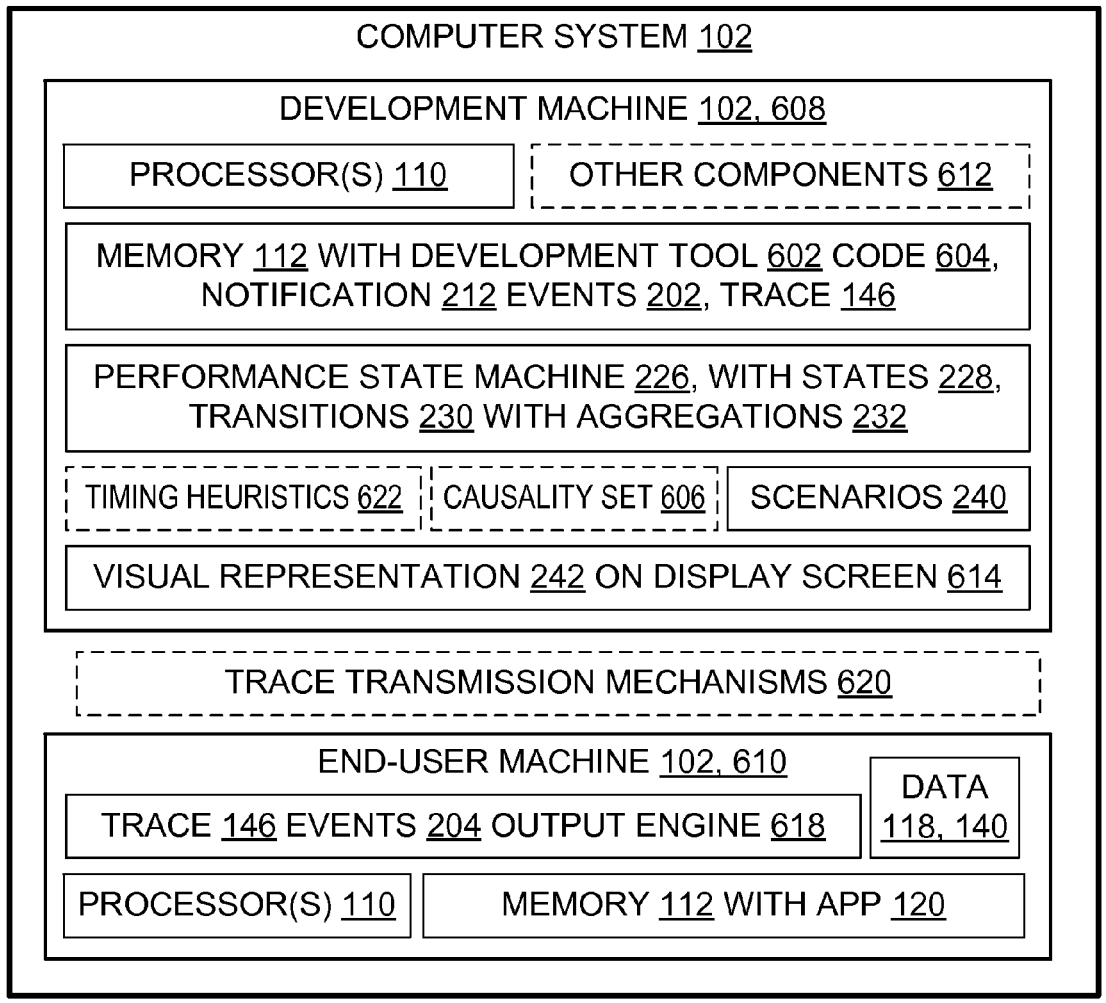
FIG. 6 is a block diagram illustrating a further example architecture with aspects of performance data aggregation and state machine control, including a development machine and an end-user machine.

FIG. 6 illustrates aspects of an architecture which is suitable for use with some embodiments. The illustrated architecture includes both a development machine 608 and an end-user machine 610. In such architectures, the machines 608 and 610 may be the same kind of machine, e.g., each two workstations, or they may be different kinds of machines, e.g., the development machine 608 could be a desktop workstation and the end-user machine 610 could be a smartphone, or the development machine 608 could be a laptop while the end-user machine 610 is a blade server, or the development machine 608 could be a desktop workstation and the end-user machine 610 could be a laptop, and so on. Also, other architectures within the scope of the disclosure include those in which focus is on the development machine 608 so no particular end-user machine is required by a claim, as well as those in which the development machine and the end-user machine are one and the same machine. Furthermore, the mapping between development machine(s) and end-user machine(s) is not necessarily one-to-one in every system; it may be one-to-many, many-to-one, or many-to-many. For example, a trace 146 from a given end-user machine may be utilized on multiple development machines.

In the architecture of FIG. 6, a system 102 includes a development machine 608 (which is itself a system 102 within the larger system) having at least one development machine processor 110, a development machine memory 112 in operable communication with the development machine processor, a display 142 screen 614, and a development tool 602 which is described further below. For clarity, memory, peripherals, and other items are collectively designated at 612. An end-user machine 610 has at least one end-user machine processor 110, an end-user machine memory 112 in operable communication with the end-user machine processor, and an application 120. A set of notification events 202 resides in the development machine memory. An execution trace 146 also resides in the development machine memory and has events 204 from an execution of the application on the end-user machine 610.

In this example, the development tool 602 has performance state machine control aggregation insertion code 604. Upon execution by the development machine processor, a portion of code 604 identifies notifications 212 from the execution trace by comparison of execution trace events 204 to notification events 202. A portion of code 604 also places a state 228 in a performance state machine 226 for each identified notification 212. A portion of code 604 also aggregates application performance data 140 for each transition 230 between identified notifications. A portion of code 604 also inserts performance data aggregations 232 in the performance state machine 226. A portion of code 604 also displays a visual representation 242 of the state machine states, transitions, and performance data aggregations on the display screen. In other examples, the code 604 omits one or more of the aforementioned portions, e.g., in some examples code 604 is not responsible for displaying a visual representation 242 of the state machine.

In some examples, the development tool 602 compares execution trace events 204 to notification events 202 at a rate of at least ten thousand comparisons per second. In some, identifying notifications in the execution trace involves comparing at least a thousand trace events 204 to at least one notification event 202, at a rate of at least a thousand comparisons per second.

In some examples, the notification events 202 belong to at least one of the following notification categories 214: application startup 302, page outline load 304, page data load start 306, page data load finish 308, page to page transition 310, application input 312, window size change 320, media query 318, binding update 322, page background task start 314, page background task finish 316, developer-defined scenario start 326, developer-defined scenario finish 328. In other examples, notification events 202 belong to at least two of these categories, or at least three of them, or at least four of them, or at least five of them. Any subset of these notification categories and/or other notification categories may also be present.

In some examples, the performance data aggregations 232 belong to (i.e., represent data 140 in) at least one of the following performance data categories 224: network activity 402, disk activity 404, memory usage 406, parse time 408, frame time 410, dropped frames 412, frame rate 414. In other examples, aggregations 232 belong to at least two of these categories, or at least three of them, or at least four of them, or at least five of them. Any subset of these performance data categories 224 and/or other performance data categories may also be present.

In some examples, the system includes a displayed timeline 238 representation of aggregated application performance data 140. The timeline 238 may be in place of, or in addition to, a performance state machine visualization.

In some embodiments, frame invalidation or other scenario causality identification module in code 604 of a development tool 602, 132 applies a list of notifications 212 to trace events 204 to produce a causality set 606 of events 204 that are (or can be) sorted chronologically. The earliest event in the causality set 606 is designated a scenario's causality.

In many embodiments, the trace 146 includes a record of some (but rarely if ever all) events that occurred during execution of a target process 120. In the target process, events may include events 204 that impact layout, render, composition and many other operations. Events (in the sense of data) are emitted by instrumentation as the events (in the sense of occurrences) happen, by a trace output engine 618 which may reside in the process 120 or run alongside it.

In some embodiments, the code 604 includes a retained graphics data structure, namely, an API and/or other data structure which implements retained mode graphics. In some embodiments, the code 604 includes a user interface thread 502. In some embodiments, the frame causality identification module includes code which upon execution by the processor(s) determines a root cause 606 of an element's participation in frame 216 creation. The element may be a window, widget, or other UI element.

In some examples, a list of scenarios 240 includes Page Load, App Startup, Window Resize, Application Input, Data Load, and/or other scenarios discussed herein. In some embodiments, scenarios may be defined in terms of notification events for any scenarios of interest to the user around application execution that will help the user inspect and optimize application performance and/or resource usage. These scenarios could be instrumented by the user, gleaned by inspecting existing traces, and/or implemented by adding new events 202 to the underlying platform.

In some examples, timing guidelines (also referred to as timing heuristics) 622 are associated with one or more scenarios. For instance, a Page Load scenario may have as a heuristic a measurement from the start of page transition to the first frame submitted on the destination page. As another instance, an App Startup scenario may have as a heuristic a measurement from the start of application execution to the first frame submitted by the app ("app" is short for "application" which is in turn short for "application program"). The heuristic measurement may be in milliseconds or another time unit, or in processor cycles, for example. Heuristics 622 can be gleaned by observing applications in the wild and formulating specific intervals that approximate to scenarios of interest to the user. They can also be directly integrated into the underlying platform as specific events or described by the user by instrumenting the code 120.

The FIG. 6 example also includes trace transmission mechanisms 620 which serialize the trace for network transmission and deserialize transmitted traces for analysis on the development machine. Trace transmission mechanisms may also perform compression/decompression and/or encryption/decryption.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a technical system, such as a portion of the Internet of Things, such that no human user 104 interacts directly and linguistically with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, an application 120 may run on one or more devices/systems 102 in a networked cloud for which trace events 204 may be captured on all or a subset and then transferred to yet other devices within the cloud, and controlling alterations may then be made on yet other cloud device(s)/system(s) 102.

With reference to FIGS. 1 through 6, some embodiments provide a computer system 102 with a logical processor 110 and a memory medium 112 configured by circuitry, firmware, and/or software to provide technical effects directed at technical problems by extending functionality as described herein.

Some embodiments combine aspects of one or more of the system embodiments of the preceding paragraphs. Some include other aspects depicted in the Figures.

In some embodiments, the frame 216 has a frame preparation time of at least 17 milliseconds but less than one second. This excludes purely mental embodiments because frames 216 are not mental artifacts. This also excludes approaches that rely on human computation because such computation of frame 216 content would far exceed 1 second. People simply cannot do calculations quickly enough by hand to provide a frame rate of even 1 FPS.

Processes

Figure 7:
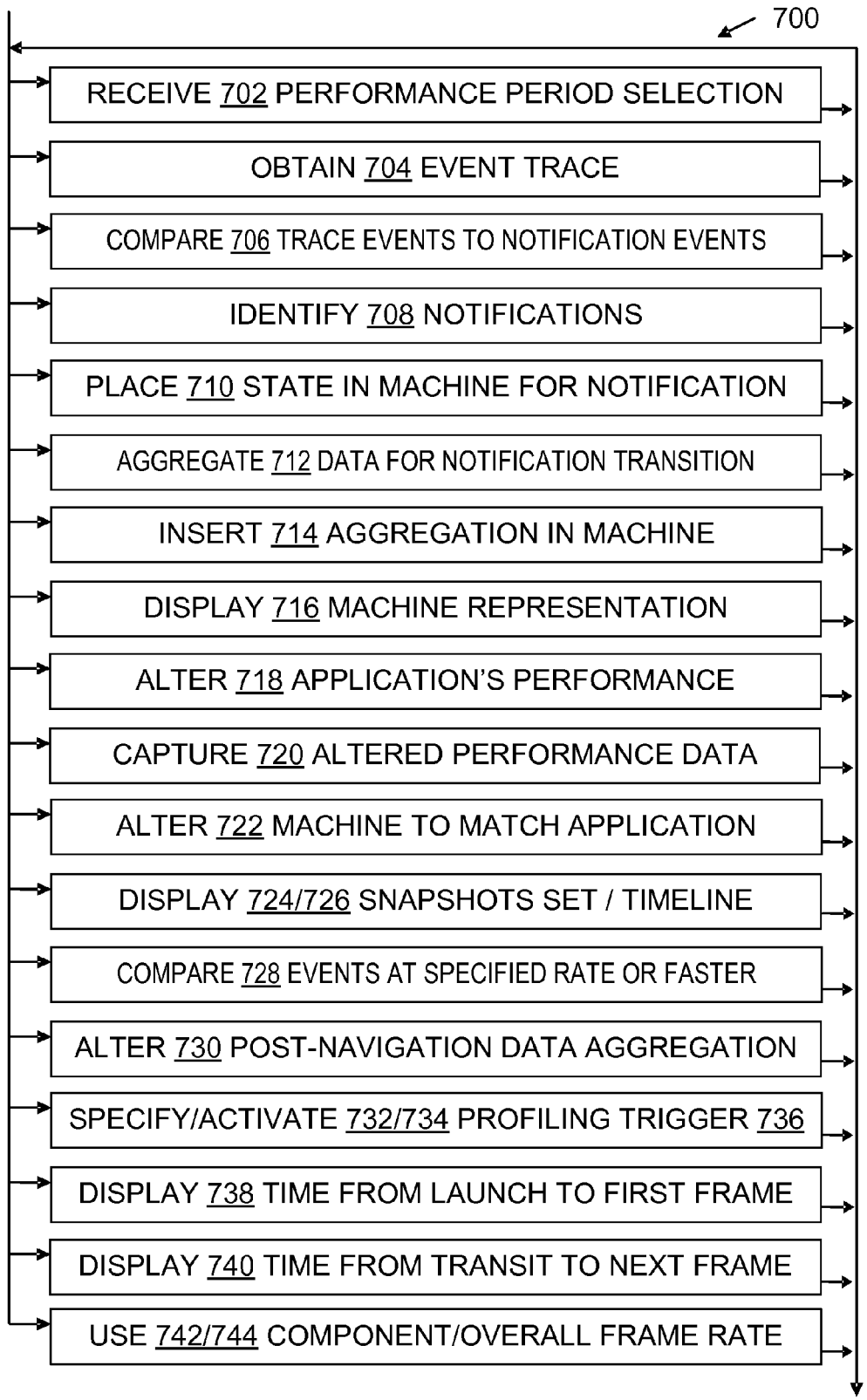
FIG. 7 is a flow chart illustrating aspects of some process and configured storage medium examples of performance state machine control with aggregation insertion.

FIG. 7 illustrates some process embodiments in a flowchart 700. Technical processes shown in the Figures or otherwise disclosed may be performed in some embodiments automatically, e.g., under control of a script or otherwise requiring little or no contemporaneous live user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 7. Steps may be performed serially, in a partially overlapping manner, or fully in parallel. The order in which flowchart 700 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different technical features, mechanisms, and/or data structures, for instance, and may otherwise depart from the examples provided herein.

During a step 702, an embodiment receives a performance period selection. The period 206 may have a default length, which can be overridden by the user, or it may require from the user an explicit specification of length (or equivalently, explicit specification of both endpoints 208). The selection may be specified in absolute or relative terms, and may take the form of a frame number, a time code, a timestamp, or a time interval, for example. The selection may be made through a tool user interface.

Some embodiments treat a trace edge 210 as a performance period endpoint 208. As a simplified example, assume a trace 146 contains the following items with the indicated timestamps (given in milliseconds):

0: trace start
1: main thread initialization complete
2: user authentication complete
3: property X changed without invalidating frame
5: media query event initiated
6: user input event, layout property changed
7: page load event, render property changed
10: property Y changed without invalidating frame
13: property Z changed without invalidating frame
14: exception raised

[application terminated]

In this simplified example, the trace has a leading edge at 0 ms and a trailing edge at 14 ms. The application termination does not appear in the trace, but is inferred from the presence of an exception as the last entry. The first bounding event is the media query event at 5 ms. The trailing edge can be treated as a performance period endpoint 208. In this embodiment, frame invalidating events are examples of notification events 202, and they include the media query, user input, and page load events at times 5, 6, and 7 ms, respectively, and the property changes at times 6 and 7 ms.

During a step 704, an embodiment obtains or otherwise receives an event trace 146. The trace may be specified by an absolute or relative file name, or an application name, for example, and may be local or transferred over network from a remote location.

During a step 706, an embodiment compares trace events to notification events, thereby filtering out events which are not pertinent to the defined notification categories 214 or scenarios 240 within the specified period 206. This is accomplished by marking events, copying them from the event trace, or otherwise distinguishing pertinent events from events that are not pertinent to specified and currently active notification categories 214 or scenarios 240 within the specified period 206. Notification categories 214 or scenarios 240 may be identified interactively by a user in some examples. Notification events 202 in a trace may be identified entirely automatically by scanning the event trace, parsing events, and comparing them to a pattern or list of recognized notification events 202.

During a step 708, an embodiment identifies notifications by grouping similar notification events. Each group of similar notifications will correspond to a state in the performance state machine.

During a step 710, an embodiment places a state 228 (e.g., struct, node, record, table row or column, or object, depending on the implementation) in a state machine 226. The state corresponds to a notification 212, which corresponds in turn to grouped notification event(s) 202 which are filtered out from the trace events 204 and/or inferred from the trace 146.

During a step 712, an embodiment aggregates performance data, which may then be used in a performance state machine. For example, after identifying two notifications 212 which have no chronologically intervening notification and hence will share a transition 230 in the state machine 226, an embodiment may aggregate (e.g., sum) all usages of a specified resource 220 which occur within a specified component of the system 102. For instance, if a media query notification and a subsequent window resize notification are identified, an embodiment may aggregate heap RAM usage by a user interface thread, in terms of total heap memory allocated, total heap memory deallocated, and net heap memory allocated between the beginning of a corresponding media query event and the beginning of a corresponding window size property change event. As another example, an embodiment may aggregate network activity from an identified page data load start to an identified subsequent data load finish to produce a network activity aggregation 232, and may also aggregate disk activity from the page data load start to the data load finish to produce a disk activity aggregation 232.

During a step 714, an embodiment inserts an aggregation 232 in a performance state machine 226. This may be accomplished by inserting or updating a cell, record field, object property, or other variable which represented an aggregation that is associated with a particular transition 230. A given transition 230 may have zero, one, or more associated aggregations 232, but each aggregation for a given transition will differ is at least one of the following: which resource(s) the aggregation represents, which resource user(s) (e.g., thread, routine, module, human user, or window) used those resource(s), which machine(s) those resource(s) were used on, the manner of use (e.g., allocated, freed, net allocated, number of accesses, total data transferred, cycles elapsed, clock time elapsed, internal system time elapsed, etc.) of those resource(s).

During a step 716, an embodiment displays a state machine representation, e.g., by displaying state names, transitions between named states, and at least one aggregation for at least one state transition in a developer tool UI.

During a step 718, an embodiment alters at least one aspect of the performance of an application 120 which was represented by a performance state machine. Alteration may be evident from a change in resource 220 usage (whether considered to be a beneficial change or not) and/or by a change in at least one execution time 222 (again, whether considered beneficial or not) and/or by a change in a sequence of operations performed (whether beneficial or not). In some embodiments, alteration 718 includes one or more of the following: eliminating a frame invalidation event, changing the location of a frame invalidation event so it occurs at a different relative point in the creation of frame(s), reducing usage of a computational resource during the creation of frame(s), reducing execution time of a layout routine and/or a render routine, or increasing an application's frame rate. Some embodiments modify a retained mode graphics structure, e.g., by changing layout properties or render properties in objects that model display elements, setting or clearing a flag, or updating a timestamp.

During a step 720, an embodiment captures altered performance, data, namely performance data from an altered 718 application 120. This may be accomplished using a profiler, instrumentation, server logs, kernel monitors, and/or other mechanisms now known or developed hereafter for capturing raw data which reflects at least part of the performance of at least part of at least one component of an application.

During a step 722, an embodiment alters a performance state machine 226 to match an application. For example, transitions can be updated to reflect aggregations of altered application performance data. In particular, a data aggregation which corresponds to application activity after navigation from a display page can be altered 730 to reflect altered application performance data. States and/or transitions can also be added, removed, and/or renamed.

During a step 724, an embodiment displays a set 234 of snapshots 236 which show values for performance data at instants in time during execution of an application 120.

During a step 726, an embodiment displays a timeline 238 showing events and/or notifications which occurred during execution of an application 120. A given embodiment may display 716 a performance state machine, display 724 snapshots, and/or display 726 a timeline.

During a step 728, which is a particular occurrence of one or more comparing steps 706, an embodiment compares trace events to notification events at a specified rate, or faster, in an implementation which cannot be achieved by human mental processes or by mere pen and paper calculations. Some examples of such rates are noted herein, and will also be apparent to one of skill in the art. Of course, those of skill will also understand that even if a human were able to perform calculations at such a rate, the data necessary for the calculations is stored in digital form and cannot be transferred to a human mind (nor can the calculation results be transferred from a human mind into digital storage 112 for subsequent use) at a rate comparable to that achieved using a computer system 102.

During a step 732, an embodiment specifies a profiling trigger 736. For example, rather than capturing all frame rate events in a trace, any of the following could be specified in a given embodiment as a profiling trigger to capture frame rate events: every Nth frame, every frame following a user-generated navigation command (e.g., play, next, or other link or button press), every call to a specified routine, every memory allocation larger than a specified number of bytes. During execution of an application, an embodiment activates 734 the trigger and captures events 204 accordingly in a trace 146.

During a step 738, an embodiment displays in a tool 132 an indication of elapsed time (e.g., microseconds, or processor cycles) from application launch to the creation of the first frame for display by the application.

During a step 740, an embodiment displays in a tool 132 an indication of elapsed time (e.g., microseconds, or processor cycles) from a transit command to the creation of the next frame for display by the application. A transit command is a command from a user which invalidates a current frame. Some embodiments reference a list of property change events that invalidate a frame, such as a list of layout properties or render properties that could appear in a trace. For example, some implementations check a pre-existing list of properties to figure out whether a property change event in the trace is a layout event or a render event, or is instead an event that does not impact frame rate or frame creation resource usage.

During a step 742, an embodiment uses component-specific frame rate for the application. As to frame rate, some embodiments include components in the form of a render thread, a UI thread and a Composition Thread; each component handles different aspects of UI layout, rasterization and composition. One can measure the frame rate of each of these threads separately, as one example of using 742 component-specific frame rate.

During a step 744, an embodiment uses an overall frame rate for the application. A given embodiment may use 742 one or more component-specific frame rates, use 744 an overall frame rate, do both, or do neither.

Figure 8:
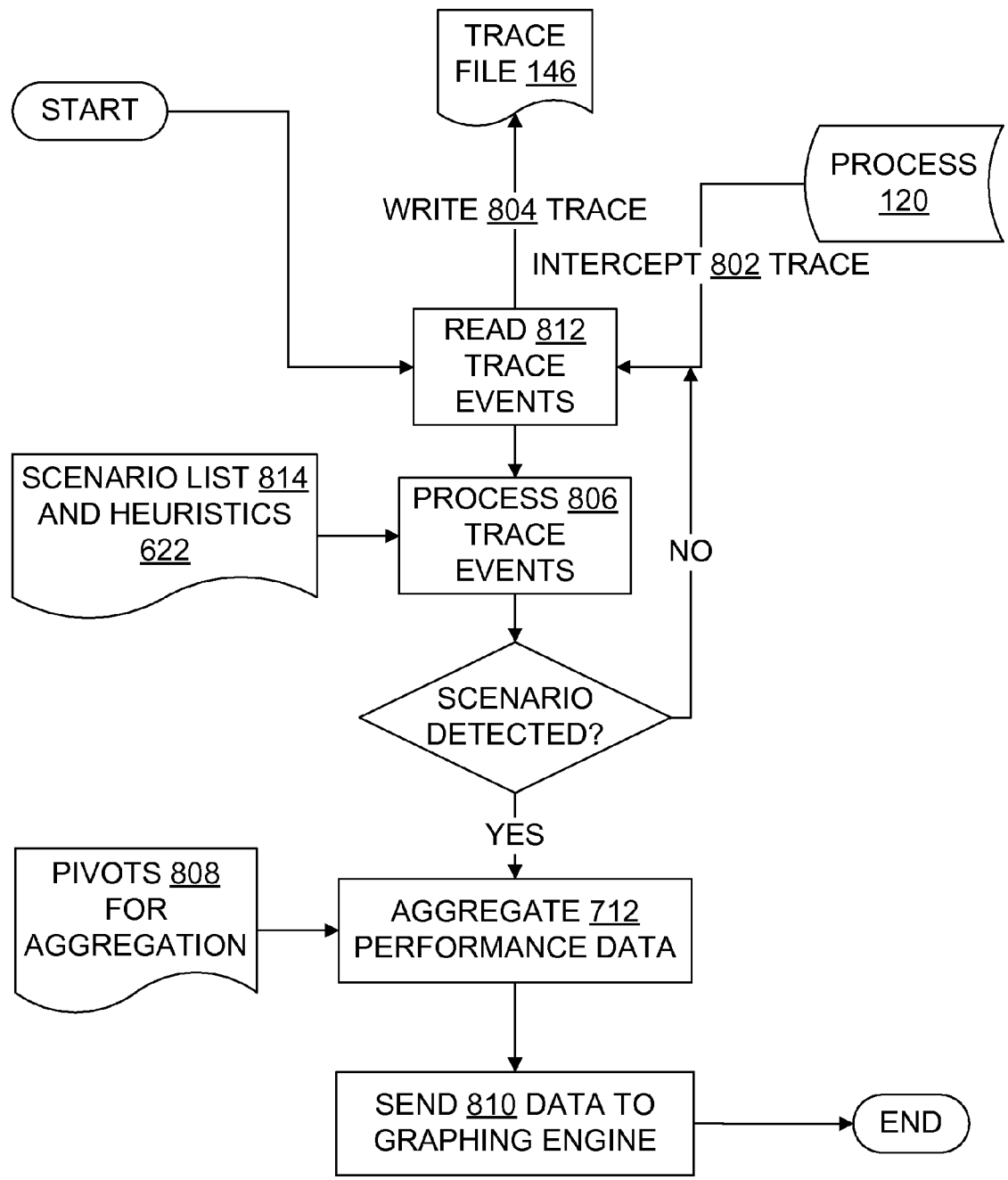
FIG. 8 is another flow chart illustrating aspects of some process and configured storage medium examples of performance state machine control with aggregation insertion.

Some embodiments are consistent with FIG. 8. Such an embodiment intercepts 802 trace 146 information from a process 120, by reading 812 events that are written 804 to a trace file or by receiving live instrumentation output, for example. The trace events are scanned, filtered, and/or otherwise processed 806 to identify notification events 202 and trace edges 210. Processing 806 may also utilize a list 814 of scenarios 240 and/or utilize timing heuristics 622. After one or more scenarios are detected, related events (e.g., property change events for a frame of interest for a frame-related scenario 304, 306, 308, 310, 320) are scanned, filtered, and/or otherwise processed to obtain a sequence of relevant (e.g., events which impact layout and/or rendering and hence may invalidate the frame). Performance data for the corresponding notifications is aggregated 712. Aggregation may utilize pivots 808 such as Disk, Network, Thread Utilization, File Access, Background Task execution, Memory, Frame rate (composition, UI, Render, etc. . . . ), More generally, any computational resources or data aggregates that affect or reflect application performance and good system citizenship may serve as pivots 808. Pivots 808 could be low level hardware resources like Disk or higher level constructs like average frame rate in a page load, for example.

In embodiments illustrated by FIG. 8, processed data is then sent to a trace report visualizer or other graphing engine. The trace report visualizer displays this data in views to the user 104, e.g., in a Gantt chart formatted, sorted by duration or start time. The processed data may read from a network connection if the trace was sent from a remote machine, e.g., in a serialized form, by a transmission mechanism 620.

Some embodiments provide a process for controlling a performance state machine. This process includes automatically identifying 708 notifications from an execution trace of an application. The execution trace includes a plurality of trace events within a period which has endpoints. The notifications are identified through comparison 706 of trace events to notification events for at least three notification categories; in other embodiments notifications are identified using at least two notification categories, or at least one notification category. This process also includes automatically placing 710 a state in a performance state machine for each identified notification. This process also includes automatically aggregating 712 application performance data for each transition between identified notifications. In this process, the performance data collectively includes data in at least two performance data categories. This process also includes automatically inserting 714 performance data aggregations in the performance state machine. This process also includes displaying 716 a visual representation of the state machine states, transitions, and performance data aggregations on a display screen. This process also includes capturing 720 altered performance of the application in an updated execution trace after the placing and inserting steps. This process also includes altering 722 at least one state, transition, or performance data aggregation of the state machine after the capturing step. Some other processes omit one or more of steps 706, 708, 710, 712, 714, 716, 720, 722. Of course, those of skill understand that additional steps or actions not recited in this paragraph may also be part of a given embodiment.

In some embodiments, the notification categories include at least three of the following: application startup, page outline load, page data load start, page data load finish, page to page transition, application input, window size change, media query, binding update, page background task start, page background task finish. In some embodiments, the notification categories also include a developer-defined scenario start and a developer-defined scenario finish. In some embodiments, the notification categories include at least four of those listed here in this paragraph. In some embodiments, the notification categories include at least five of those here. In some embodiments, the notification categories include at least two of those here, and in some they include at least one of the notification categories. Of course, those of skill understand that additional notification categories not recited in this paragraph may also be part of a given embodiment.

In some embodiments, the performance data categories include at least two of the following: network activity, disk activity, memory usage, parse time, frame time, dropped frames, frame rate, thread utilization. In some, they include at least three of the listed performance data categories, and in some they include at least four of the listed performance data categories. Of course, those of skill understand that additional performance data categories not recited in this paragraph may also be part of a given embodiment.

In some embodiments, the process includes displaying 724 and/or displaying 726 at least one of the following visual representations of aggregated application performance data: a linear set of snapshots, or a timeline.

In some embodiments, identifying 708 notifications in the execution trace comprises comparing 706, 728 at least a thousand trace events to at least one notification event each, at a rate of at least a thousand comparisons per second. In some, identifying 708 notifications in the execution trace comprises comparing 706, 728 at least a hundred thousand trace events to at least one notification event each, at a rate of at least ten thousand comparisons per second.

In some embodiments, altering 722 at least one state, transition, or performance data aggregation of the state machine comprises altering 730 application performance data for a transition from a page navigation request state to a page loaded state in which a frame of a post-navigation requested page has been submitted by the application to a compositor.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (as opposed to mere propagated signals). The storage medium which is configured may be in particular a removable storage medium 114 such as a CD, DVD, or flash memory. A general-purpose memory, which may be removable or not, and may be volatile or not, can be configured into an embodiment using items such as a performance state machine 226, notification events 202, scenarios 240, heuristics 622, and/or code 604, in the form of data 118 and instructions 116, read from a removable medium 114 and/or another source such as a network connection, to form a configured medium. The configured medium 112 is capable of causing a computer system to perform technical process steps for display invalidation and/or frame causality attribution as disclosed herein. FIGS. 1 through 8 thus help illustrate configured storage media embodiments and process embodiments, as well as system and process embodiments. In particular, any of the process steps illustrated in FIG. 7 and/or FIG. 8, or otherwise taught herein, may be used to help configure a storage medium to form a configured medium embodiment.

In some examples, a computer-readable storage medium is configured with data and instructions which upon execution by a digital processor perform a process for controlling a performance state machine. This process includes identifying 708 notifications from an execution trace of an application. The execution trace includes a plurality of trace events within a period which has endpoints. The notifications are identified through comparison 706 of trace events to notification events for at least four of the following notification categories: application startup, page outline load, page data load start, page data load finish, page to page transition, application input, window size change, media query, binding update, page background task start, page background task finish, developer-defined scenario start, developer-defined scenario finish. This process also includes placing 710 a state in a performance state machine for each identified notification. This process also includes aggregating 712 application performance data for each transition between identified notifications. The performance data collectively includes data in at least three of the following performance data categories: network activity, disk activity, memory usage, parse time, frame time, dropped frames, frame rate. This process also includes inserting 714 performance data aggregations in the performance state machine. This process also includes displaying 716 a visual representation of the state machine states, transitions, and performance data aggregations on a display screen. This process also includes capturing 720 altered performance of the application in an updated execution trace after the placing and inserting steps. This process also includes altering 722 at least one state, transition, or performance data aggregation of the state machine after the capturing step. This process also includes displaying 716 an altered visual representation of the state machine states, transitions, and performance data aggregations on the display screen. Some other processes omit one or more of steps 706, 708, 710, 712, 714, 716, 720, 722. Of course, those of skill understand that additional steps or actions not recited in this paragraph may also be part of a given embodiment.

In some embodiments, the process also includes displaying 726 a timeline representing aggregated application performance data.

In some embodiments, the process also includes displaying 724 a linear set of snapshots representing aggregated application performance data.

In some embodiments, identifying notifications in the execution trace includes comparing 706, 728 at least a hundred thousand trace events to at least one notification event each, at a rate of at least a hundred thousand comparisons per second. In some embodiments, identifying notifications in the execution trace includes 706, 728 comparing at least five hundred thousand trace events to at least one notification event each, at a rate of at least a hundred thousand comparisons per second.

In some embodiments, the process also includes specifying 732 a profiling trigger, and the performance data includes data collected in response to activation 734 of the profiling trigger during execution of the application.

In some embodiments, the displaying step includes displaying 740 a measure of time elapsed from when the application is launched by an operating system to when a first frame is submitted by the application to the operating system.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

The following discussion is derived from Visual Studio® documentation (mark of Microsoft Corporation). The various versions of Visual Studio® tools are programs implemented by Microsoft Corporation. Aspects of the Visual Studio® programs and/or documentation are consistent with or otherwise illustrate aspects of the embodiments described herein. However, it will be understood that Visual Studio® documentation and/or implementation choices do not necessarily constrain the scope of such embodiments, and likewise that Visual Studio® software and/or its documentation may well contain features that lie outside the scope of such embodiments. It will also be understood that the discussion below is provided in part as an aid to readers who are not necessarily of ordinary skill in the art, and thus may contain and/or omit details whose recitation below is not strictly required to support the present disclosure.

Some implementations exert control by eliminating, moving, and/or reducing resource usage which results in a property change and/or other notification event, and/or by reducing processing time which led to the event.

By treating a trace edge as a notification event, some examples provide control despite dropped events which occurred during execution but are not reflected in the trace 146.

By providing control despite the presence of many (e.g., hundreds and/or at least 80%) events in a trace that do not impact frame invalidation or otherwise match some notification event, some examples improve development efficiency by identifying fruitful targets for optimization. Some optimizations then alter 718 application performance by removing unnecessary frames. Some optimizations alter 718 application performance by reducing excessive frame preparations for the frames that are deemed necessary (e.g., because they present data the end user expects to see or data that notifies the end user of status changes the end user would respond to).

In some examples, a tool 132 user interface, such as an IDE 144 user interface, displays some or all of the following data with corresponding labels: a diagnostic session length in seconds; a bar chart of UI thread utilization with a legend for color codes distinguishing parsing, layout, render, I/O, app code, Extensible Application Markup Language (XAML) usage, and other activities; a line graph of visual throughput in FS with a legend for color codes distinguishing a composition thread from a UI thread; a timeline with detail headings or links for obtaining details on application startup, parsing (app), window resize, page load (MainPage), parsing (MainPage), one or more layout activity sections, one or more render activity sections, and one or more disk (dll) activity sections within a layout or render section.

As to scenarios where an implementation can be used to understand why specific elements participated in Layout or Render, in some cases, given a set of N property change events, an implementation can help a developer determine the root cause of an element's participation by looking at the first property change event that either changed a property on the element under inspection or one of its parents. This helps a developer troubleshoot issues when large number (hundreds or more) of elements take part in layout, thus increasing the total layout time proportionately.

Some implementations rely on, or include and rely on, instrumentations in place in a platform. Instrumentation provides an ability to monitor property changes in the application 120. Instrumentation may also provide a classification methodology to help developers understand which events impact frame invalidation. Instrumentation may also provide an ability to monitor application scenarios like StateChange (e.g., media query execution in HTML), Window Resize, Transient or Binding expression updates.

In some examples, Gantt chart based timeline views and/or other visualizations configure a display in a tool. In some, causality chained events can be viewed in dependency chains which show links from the frame in question to the underlying causality event or events. Some implementations highlight causality events in a developer's view when the frame in question is highlighted in the tool user interface.

Some implementations bring issues/opportunities of optimization up to the front by automatically aggregating performance data on scenarios important to application responsiveness and fluidity. In some cases, these scenarios include Application Startup, Page Load & Transition, Application Input, and Window Size Changes, but those of skill will acknowledge many more scenarios may be of interest in a given situation. Users 104 can also use these scenarios to visualize their application execution like a state machine in order to identify opportunities for optimization throughout its execution Some implementations look at events 204 spewed out by a platform. Based on a list of pre-determined scenarios (and possibly heuristics), they generate a view of the program execution with the performance data of interest to the developer.

Instrumentation

In order to aggregate and visualize the information, some implementations rely on having some notification events from the platform around the scenarios of interest. Scenarios of interest may include adaptive app sizing, data set loads in item controls, application startup, view load, user input and/or others, for example.

Methodology

Once the trace for the session is collected and processed (either in real-time or postmortem), some implementations look for notification events (sorted by start time: Ascending) that are a part of a list. For each notification, performance data is aggregated. One kind of aggregation includes the following categories, which may be varied according to particular heuristics on a per-scenario basis, e.g., only show page loads if the load time>x secs, where x is either a default value or provided interactively by the developer. In this example, the aggregation categories include: Network activity, data transferred/data downloaded, Disk activity, Memory usage, Parse times, Average Frame times, Dropped Frames. This data set is sent 810 to a graphics/charting engine that generates the state machine for the same.

Visualization

One way of visualizing this information is as a state machine 226 in which each page load or significant change in UI is represented as a state. User input, adaptive changes, and so on are represented as transitions to/from the state. Performance data is aggregated and represented for each state and its transition(s). Another way of visualizing this information is as snapshots, e.g., a linear set of snapshots for each state and its transitions. Performance data is aggregated for each snapshot. Another way of visualizing this information is as events in Gantt chart timeline(s) to showcase the breadth of time encompassed by a particular scenario.

By automatically identifying scenarios of interest in an application and aggregating performance data on the same, and by visualizing scenarios as a state machine, these examples help identify opportunities for optimization and help developers understand performance data in the context of application scenarios and a given sequence of interactions.

Some Additional Combinations and Variations

Any of these combinations of code, data structures, logic, components, signals, signal timings, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the medium combinations and variants describe above.

Some examples include a means for identifying optimizations which includes software that compares 706 events 204 from an execution trace 146 to notification events 202 and filters out other events 204. Some examples include a means for identifying optimizations which includes software that satisfies particular comparison 728 rates.

Some examples include a means for identifying optimizations which includes software that operates in a manner consistent with the flowchart of FIG. 8. Some examples include a means for identifying optimizations which includes software that operates in a manner consistent with the flowchart of FIG. 7.

Some examples operate on traces for an application that includes a UI thread 502, whereas other examples do not, e.g., they operate on traces from an application that is not multi-threaded.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 7 and 8 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A process for controlling a performance state machine, comprising:

automatically identifying notifications from an execution trace of an application, the execution trace including a plurality of trace events within a period which has endpoints, the notifications identified through comparison of trace events to notification events for at least three of the following notification categories: application startup, page outline load, page data load start, page data load finish, page to page transition, application input, window size change, media query, binding update, page background task start, page background task finish, developer-defined scenario start, developer-defined scenario finish;

automatically placing a state in a performance state machine for each identified notification;

automatically aggregating application performance data for each transition between identified notifications, the performance data collectively including data in at least two performance data categories;

automatically inserting performance data aggregations in the performance state machine;

displaying a visual representation of the state machine states, transitions, and performance data aggregations on a display screen;

capturing altered performance of the application in an updated execution trace after the placing and inserting steps; and altering at least one state, transition, or performance data aggregation of the state machine after the capturing step.

2. The process of claim 1, wherein the performance data categories include at least two of the following: network activity, disk activity, memory usage, parse time, frame time, dropped frames, frame rate, thread utilization.

3. The process of claim 1, further comprising displaying at least one of the following visual representations of aggregated application performance data: a linear set of snapshots, or a timeline.

4. The process of claim 1, wherein identifying notifications in the execution trace comprises comparing at least a thousand trace events to at least one notification event each, at a rate of at least a thousand comparisons per second.

5. The process of claim 1, wherein identifying notifications in the execution trace comprises comparing at least a hundred thousand trace events to at least one notification event each, at a rate of at least ten thousand comparisons per second.

6. The process of claim 1, wherein altering at least one state, transition, or performance data aggregation of the state machine comprises altering application performance data for a transition from a page navigation request state to a page loaded state in which a frame of a post-navigation requested page has been submitted by the application to a compositor.

7. The process of claim 1, wherein notifications identified through comparison of trace events to notification events further include notifications in a list of objects, a list of routines, or a category identified interactively by a user.

8. The process of claim 1, wherein notifications identified through comparison of trace events to notification events further include one or more items which invalidates a frame when the item is changed or invoked.

9. A computer-readable storage medium configured with data and instructions which upon execution by a digital processor perform a process for controlling a performance state machine, the process comprising:

identifying notifications from an execution trace of an application, the execution trace including a plurality of trace events within a period which has endpoints, the notifications identified through comparison of trace events to notification events for at least four of the following notification categories: application startup, page outline load, page data load start, page data load finish, page to page transition, application input, window size change, media query, binding update, page background task start, page background task finish, developer-defined scenario start, developer-defined scenario finish;

placing a state in a performance state machine for each identified notification;

aggregating application performance data for each transition between identified notifications, the performance data collectively including data in at least three of the following performance data categories: network activity, disk activity, memory usage, parse time, frame time, dropped frames, frame rate;

inserting performance data aggregations in the performance state machine; and displaying a visual representation of the state machine states, transitions, and performance data aggregations on a display screen.

10. The computer-readable storage medium of claim 9, wherein the process further comprises displaying a timeline representing aggregated application performance data.

11. The computer-readable storage medium of claim 9, wherein the process further comprises displaying a linear set of snapshots representing aggregated application performance data.

12. The computer-readable storage medium of claim 9, wherein identifying notifications in the execution trace comprises comparing at least a hundred thousand trace events to at least one notification event each, at a rate of at least a hundred thousand comparisons per second.

13. The computer-readable storage medium of claim 9, wherein identifying notifications in the execution trace comprises comparing at least five hundred thousand trace events to at least one notification event each, at a rate of at least a hundred thousand comparisons per second.

14. The computer-readable storage medium of claim 9, wherein the process further comprises specifying a profiling trigger, and the performance data includes data collected in response to activation of the profiling trigger during execution of the application.

15. The computer-readable storage medium of claim 9, wherein the displaying step comprises displaying a measure of time elapsed from when the application is launched by an operating system to when a first frame is submitted by the application to the operating system.

16. A system comprising:

a development machine having at least one development machine processor, a development machine memory in operable communication with the development machine processor, a display screen, and a development tool which is described further below;

an end-user machine having at least one end-user machine processor, an end-user machine memory in operable communication with the end-user machine processor, and an application;

a set of notification events residing in the development machine memory, the notification events belonging to at least three of the following notification categories: application startup, page outline load, page data load start, page data load finish, page to page transition, application input, window size change, media query, binding update, page background task start, page background task finish, developer-defined scenario start, developer-defined scenario finish;

an execution trace residing in the development machine memory and having events from an execution of the application on the end-user machine; and the development tool having code which upon execution by the development machine processor identifies notifications from the execution trace by comparison of execution trace events to notification events, places a state in a performance state machine for each identified notification, aggregates application performance data for each transition between identified notifications, inserts performance data aggregations in the performance state machine, and displays a visual representation of the state machine states, transitions, and performance data aggregations on the display screen.

17. The system of claim 16, wherein the development tool compares execution trace events to notification events at a rate of at least ten thousand comparisons per second.

18. The system of claim 16, wherein the notification events belong to at least three of the following notification categories: application startup, page outline load, page data load start, page data load finish, page to page transition, application input, window size change, media query, binding update, page background task start, page background task finish, developer-defined scenario start, developer-defined scenario finish.

19. The system of claim 16, wherein the performance data aggregations belong to at least two of the following performance data categories: network activity, disk activity, memory usage, parse time, frame time, dropped frames, frame rate.

20. The system of claim 16, further comprising a displayed timeline representation of aggregated application performance data.

* * * * *